E. ENBERG.
RUNNER FOR SIDE CARS.
APPLICATION FILED MAR. 25, 1919.
1,345,321.
Patented June 29, 1920.
Fig. 1.
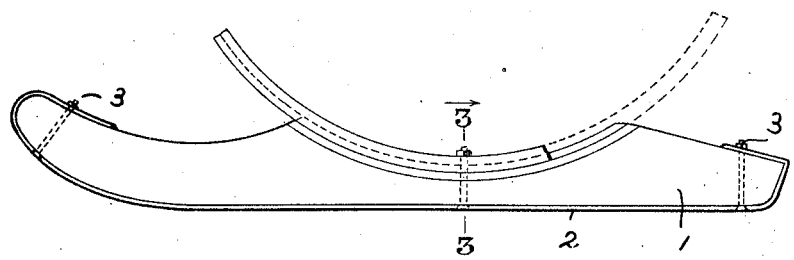
Fig. 2.
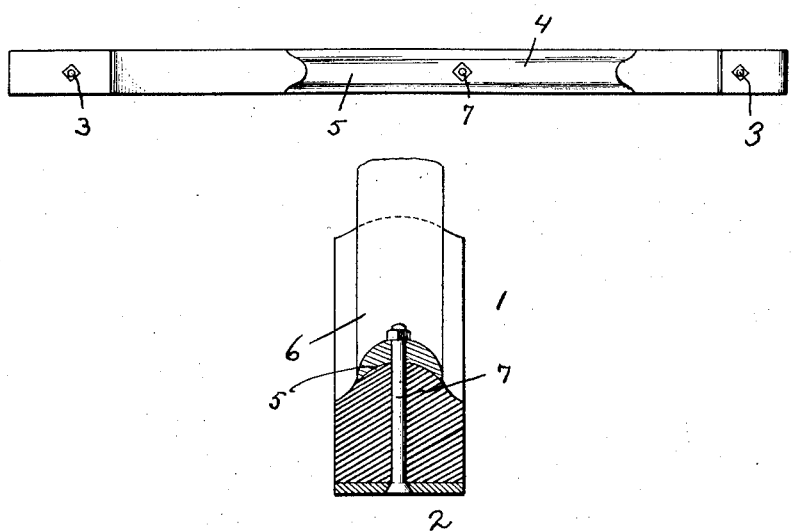
Fig. 3.
Inventor
Elmer Enberg
Attorney

UNITED STATES PATENT OFFICE.

ELMER ENBERG, OF AITKIN, MINNESOTA.

RUNNER FOR SIDE CARS.

1,345,321.  Specification of Letters Patent.  Patented June 29, 1920.

Application filed March 25, 1919. Serial No. 284,972.

*To all whom it may concern:*

Be it known that I, ELMER ENBERG, a citizen of the United States, residing at Aitkin, in the county of Aitkin and State of Minnesota, have invented certain new and useful Improvements in Runners for Side Cars; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in runners for side cars and consists of a simple and efficient device of this nature having various details of construction, combination and arrangement of parts which will be hereinafter fully described, shown in the accompanying drawings and then specifically defined in the appended claim.

My invention is illustrated in the accompanying drawings which, with the letters of reference marked thereon, form a part of this application, and in which:

Figure 1 is a side elevation of the runner shown as applied to a rear wheel.

Fig. 2 is a top plan view, and

Fig. 3 is a sectional view on line 3—3 of Fig. 1.

Reference now being had to the details of the drawings by numerals:

1 designates a runner which may be of any desired shape and which has a shoe 2, the ends of which are bent over the opposite ends of the runner, and held in place by bolts 3 passing through apertures in the runner. The upper portion of the runner is concaved as at 4, and has a convexed ridge 5 in the bottom of the concaved portion, as shown clearly in Figs. 2 and 3 of the drawings, and which convexed portion is adapted to conform to and engage the hollow channel in the rim 6.

Said rim, runner and shoe are provided with registering apertures adapted to receive a bolt 7 for the purpose of holding the rim securely to the shoe.

By the provision of a runner made in accordance with my invention, it will be noted that a simple and efficient means is provided whereby side cars and wheels of other vehicles may be utilized for use in snowy weather, by simply fastening the wheel to the runner in the manner hereinbefore described, after the tire has been removed from the same.

What I claim to be new is:

A runner for wheels of side cars, etc., having the upper edge thereof provided with an elongated concaved recess, the longitudinal center of which is rearward of the longitudinal center of the runner, the bottom of the recess having a central convexed ridge with portions intermediate the same and the opposite faces of the runner being concave, and means passing through said ridge for holding a channeled wheel against said ridge.

In testimony whereof I hereunto affix my signature in presence of two witnesses.

ELMER ENBERG.

Witnesses:
T. F. MOUNT,
HENRY D. MCNEIL.